Sept. 30, 1958

W. I. THOMPSON 2,853,859

COLD TRAPS

Filed May 4, 1945

Inventor
William I. Thompson

By Robert A. ~~~~~~~
Attorney

United States Patent Office 2,853,859
Patented Sept. 30, 1958

2,853,859

COLD TRAPS

William I. Thompson, Elizabeth, N. J., assignor, by mesne assignments, to the United States of America as represented by the United States Atomic Energy Commission Application May 4, 1945, Serial No. 591,895

2 Claims. (Cl. 62—40)

This invention relates to cold traps, and in particular to cold traps of large solid capacity for removing a condensable component of a gas from a gas line.

In the operation of plants for the separation of the isotopes of uranium hexafluoride by diffusion through a barrier, it is necessary at intervals to bypass a cell for the purpose of barrier replacements. Also, it is occasionally necessary to shut down a cell due to bearing failure, seal failure, and the like. At each shutdown, the process gas must be removed from the unit and transferred to an active unit. This involves evacuating gas from the shut down cell and collecting it in solid form in a suitable cold trap. To return process gas to the system, the trap is first warmed and then purged of residual vapor with purge gas, such as dry nitrogen. Since dry nitrogen gas is much lighter than either of the isotopes of uranium being separated, it is desirable to use no more purge gas than is absolutely necessary to clear the trap as an excessive amount of light gas in the system will reduce the efficiency at which the barriers can separate the uranium isotopes.

In cold traps heretofore used, gas was passed over banks of tubes containing refrigerant with the result that the gas was condensed on the outer surfaces of such tubes. The capacity of such a trap is reached when deposits of solid material on adjacent tubes became sufficiently thick to touch. This may occur either at the trap inlet or at the point where the gas mixture reaches saturation and solid particles begin to form in the gas stream. While such design is satisfactory for traps of small solid capacity, it is cumbersome for large capacity traps. Also, cold traps of the sort heretofore used contain dead spaces requiring the use of excessive amounts of gas to purge the trap. A further disadvantage present in conventional traps is the danger of leakage of refrigerant in and around the tubes of the trap. This is particularly objectionable since it results in contamination of the process gas.

An object of my invention is to provide a cold trap of large solid capacity.

A further object is to provide a trap of simple and rugged construction having a minimum number of joints that must be made leak proof.

A further object is to provide a trap having internal fins so arranged that solid material will be deposited evenly throughout the trap and thereby avoid premature plugging of the trap.

A further object is to provide a trap that is free of dead spaces so that it may be cleared with a minimum of purge gas.

The foregoing objects are achieved in my improved cold trap, by providing a trap that comprises generally an elongated casing or container provided with a series of internal fins and divided longitudinally by a baffle into two compartments or chambers of unequal size. The larger of these compartments acts as a precooling chamber wherein the bulk of process gas entering the trap is condensed, and the smaller compartment functions as a clean-up chamber in which is solidified any gas or mist passing through the precooling chamber. Cooling is effected by immersing or bathing the trap with a refrigerant such as for example liquid nitrous oxide, $N_2O$.

My invention may be better understood by reference to the drawings, wherein.

Figure 1:
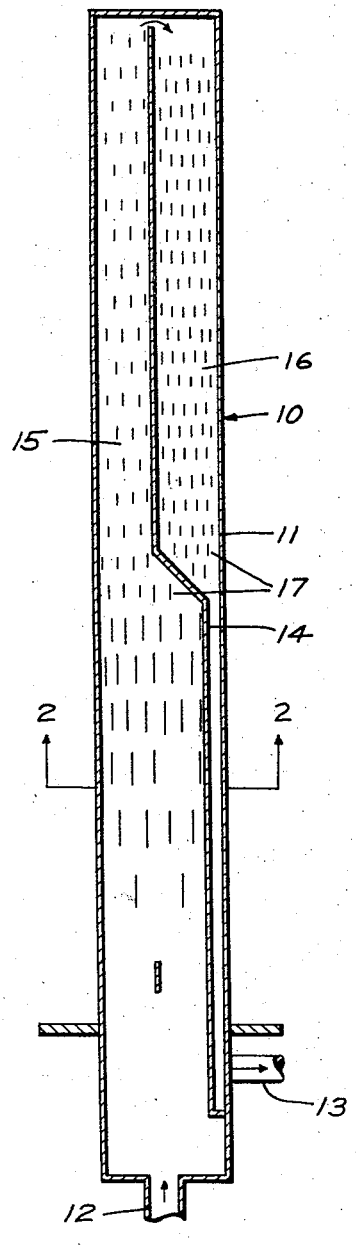
Fig. 1 represents a cross-section of my improved cold trap.
Figure 2:
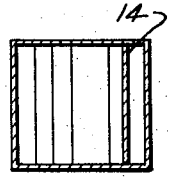
Fig. 2 represents a cross-section taken along line 2—2 of Fig. 1.

With respect to the drawings, a trap 10 according to my invention may comprise an outer container or casing 11 that is of generally elongated shape and substantially square in cross-section. The casing has a gas inlet 12 at one end thereof, and a gas outlet tube 13 at one side of the casing adjacent the gas inlet. The interior of the casing is divided longitudinally by a baffle 14 that extends from adjacent the gas outlet in closely spaced parallel relation to the outlet side wall of the casing to a point approximately midway lengthwise of the casing where it inclines inwardly and then extends axially lengthwise of the casing terminating in spaced relation with the other end wall of the casing opposite remote from the inlet 12. The baffle 14 thus divides the casing 11 into two chambers 15, 16 of unequal size that intercommunicate at the end of the casing remote from the gas inlet 12 thereto.

The larger compartment 15 constitutes a pre-cooling chamber wherein the bulk of process gas entering at 12 is solidified. Unsolidified process gas and mist not condensed in the chamber 15 pass around the end of the baffle 14 and enter the chamber 16 that acts as a clean up chamber and solidifies gas and mist not condensed in the first chamber 15. Fins 17 are provided within the compartments 15 and 16 and these are welded or soldered to the casing and operate to remove the heat of condensation. To prevent premature plugging of the trap, fins 17 are relatively widely spaced in compartment 15 adjacent the gas inlet 12, while in compartment 16 the fins are spaced more closely together. Preferably the fins in compartments 15, 16 are spaced at progressively decreasing intervals and extend from one wall of the casing to the opposite wall thereof, permitting removal of the heat of condensation in either direction. Also I prefer to stagger the fins so that the gas travels in a sinuous path through the trap. Such an arrangement increases the effective length of the trap and makes for more efficient cooling. While any suitable material may be used, I prefer to make the trap of copper except for the gas inlet and outlet connections, which are of Monel metal.

In operation, the trap is immersed or bathed in a suitable refrigerant, such as for example, liquid nitrous oxide, $N_2O$. Gas is admitted to the trap through inlet 12 and passes through the compartment 15 wherein the bulk of the gas condenses and forms a solid coating on the fins 17 and the compartment walls. Residual mist and unsolidified gas continue through the compartment 15 and ultimately pass around the end of baffle 14 into chamber 16 wherein they solidify on the fins 17 therein. Since the fins 17 are relatively widely spaced near the gas inlet and are progressively more closely spaced from the inlet to the outlet, solid matter is deposited evenly throughout the trap so that the entire volume of the latter becomes substantially filled with solidified gas before plugging occurs. To transfer the material to an active unit the trap is warmed and process gas is pumped out. Any residual vapor remaining is cleared by purging the trap with dry nitrogen gas.

My improved cold trap represents a significant advance over cold traps heretofore used in that it has a large capacity for solid matter, is free from premature plugging, is relatively free from dead spaces and has a minimum number of joints to be maintained leak proof.

While I have described a preferred form of cold trap embodying my invention, it will be understood that I do not intend to limit or confine myself thereto, and modifications in the design of my improved cold trap will readily occur to those skilled in the art without departing from the scope of the invention as set forth in the appended claims.

I claim:

1. A cold trap of large solid capacity comprising an elongated casing having a gas inlet and a gas outlet, said casing being of heat conducting material adapted to be cooled by a refrigerant, a baffle longitudinally dividing the interior of said casing into two intercommunicating compartments of unequal size, the larger of said compartments being in communication with the gas inlet and the smaller compartment being in communication with the gas outlet, and fins within said compartments, the fins being spaced in staggered relationship and at decreasing intervals relative to one another from the gas inlet to the gas outlet.

2. A cold trap as set forth in claim 1 in which the fins are arranged throughout the casing in parallel rows that extend transversely thereof.

References Cited in the file of this patent

UNITED STATES PATENTS

| | | |
|---|---|---|
| 309,027 | Burghardt | Dec. 9, 1884 |
| 640,796 | Neuhs | Jan. 9, 1900 |
| 1,524,520 | Junkers | Jan. 27, 1925 |
| 2,057,001 | Bogdany et al. | Oct. 13, 1936 |
| 2,317,814 | Schuchmann et al. | Apr. 27, 1943 |